(12) United States Patent  
Yamada

(10) Patent No.: US 7,061,638 B2  
(45) Date of Patent: Jun. 13, 2006

(54) IMAGE ENCODING APPARATUS

(75) Inventor: Hideaki Yamada, Ichihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 861 days.

(21) Appl. No.: 09/921,908

(22) Filed: Aug. 6, 2001

(65) Prior Publication Data

US 2002/0051140 A1    May 2, 2002

(30) Foreign Application Priority Data

Sep. 28, 2000    (JP)    ............................. 2000-296469

(51) Int. Cl.  
*G06F 15/00*    (2006.01)

(52) U.S. Cl. .................. 358/1.15; 358/1.12; 358/1.18; 358/1.9; 358/450; 358/451; 382/286; 382/297; 382/298

(58) Field of Classification Search ............... 358/1.15, 358/1.12; 382/286  
See application file for complete search history.

(56) References Cited

U.S. PATENT DOCUMENTS

| | | | |
|---|---|---|---|
| 4,658,430 A * | 4/1987 | Anderson et al. ........... 382/297 |
| 4,689,824 A * | 8/1987 | Mitchell et al. ............. 382/297 |
| 4,837,845 A * | 6/1989 | Pruett et al. ................ 382/297 |
| 5,557,715 A * | 9/1996 | Ichiyanagi .................. 345/658 |
| 5,724,157 A * | 3/1998 | Otani et al. ................. 358/450 |
| 5,751,865 A * | 5/1998 | Micco et al. ................ 382/296 |
| 5,767,911 A * | 6/1998 | Boon ..................... 375/240.12 |
| 5,867,598 A * | 2/1999 | de Queiroz ................. 382/235 |
| 5,987,184 A * | 11/1999 | Kweon et al. .............. 382/250 |
| 6,307,966 B1* | 10/2001 | Chapin ....................... 382/232 |
| 6,381,371 B1* | 4/2002 | Epstein et al. ............. 382/246 |
| 6,941,019 B1* | 9/2005 | Mitchell et al. ............ 382/232 |

FOREIGN PATENT DOCUMENTS

JP    11-313210    11/1999

OTHER PUBLICATIONS

Computer Translation of Japanese Patent Document No. 11-313210 to Hirakawa, dated Nov. 9, 1999.*

* cited by examiner

*Primary Examiner*—Edward Coles  
*Assistant Examiner*—Mark R. Milia  
(74) *Attorney, Agent, or Firm*—Birch, Stewart, Kolasch & Birch, LLP

(57) ABSTRACT

When an input image and a sender information image independent from each other are combined into one transmission image in which the sender information image which has a lower line count (smaller area) is laid out in the upper portion while the input image having a greater area than the sender information image is laid out in the lower portion, both the input image and sender information image are individually rotated by 180 degrees before encoding, then the transmission image is encoded by JPEG from the input image side having a greater area.

7 Claims, 11 Drawing Sheets

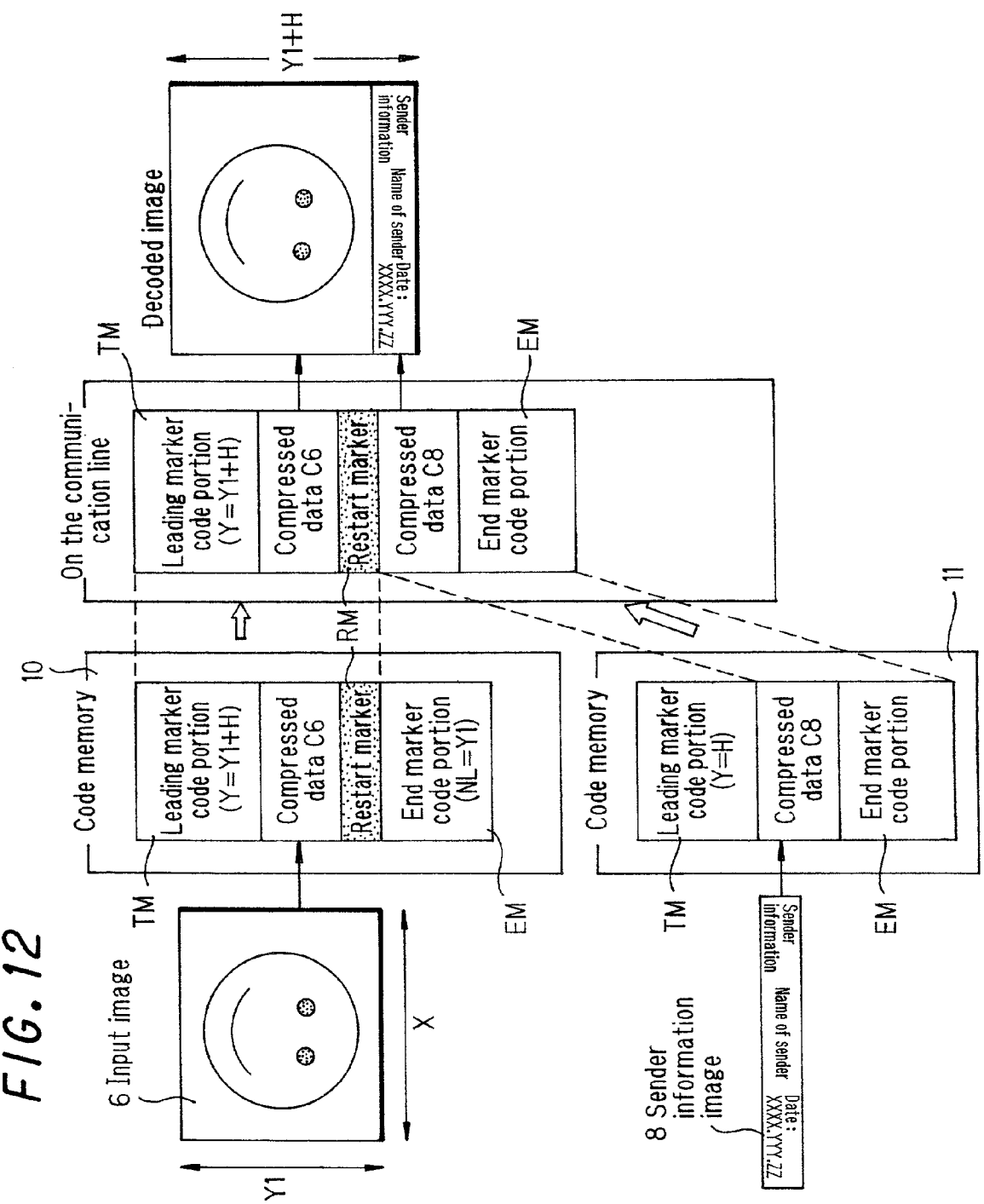

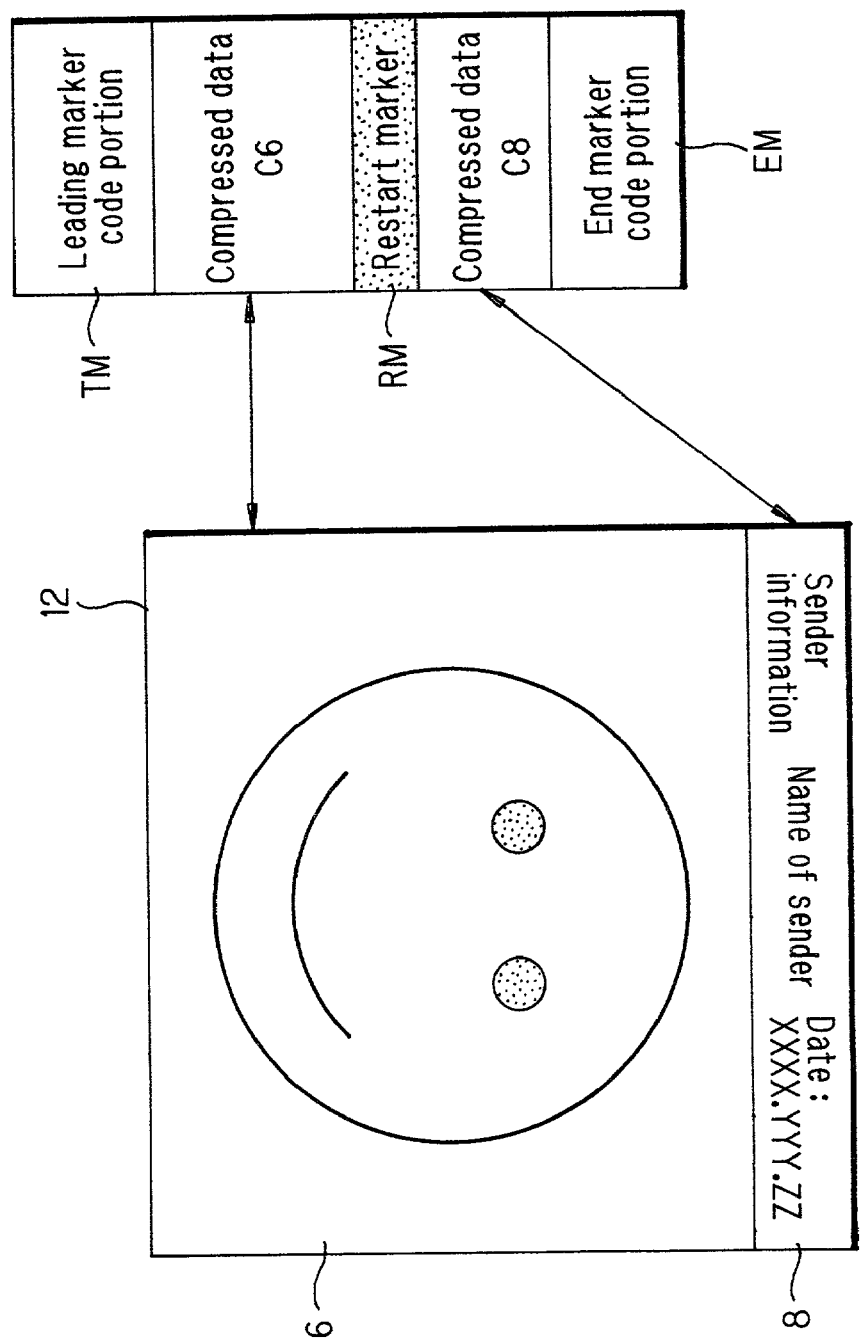

IMAGE ENCODING APPARATUS

BACKGROUND OF THE INVENTION

1. Field of the Invention

The present invention relates to a color facsimile machine using JPEG based on ITU-T standards as its encoding system as well as relating to a contents distribution service having a color facsimile transmission function.

2. Description of the Prior Art

In general, facsimile transmission has the advantage of urgently and rapidly transmitting and providing necessary information and in order to make this advantage further useful, sender information that indicates the information source and when the information was provided is attached to the sending original.

A facsimile machine using a sheet feed scanner and having no memory for storing the whole image implements data transmission whilst reading the original and creating its image data. Therefore, the sender information is added before encoding then the image data and the sender information are encoded integrally and sent.

There are some cases where image data should once be stored in the memory and the stored data should be sent some time later, such as cases for predetermined time transmission, re-dialing transmission, contents distribution service and the like. Transmission of this type will be called 'memory transmission'. There are four ways of memory transmission as follows:

(Method 1)

This method is implemented by first scanning the image data, storing it directly into the memory without coding (compressing), and adding the sender information to the image data when memory transmission is actually performed, then integrally encoding the image data with the sender information and transmitting it.

(Method 2)

This method is implemented by scanning the image data, encoding it beforehand and storing the coded data into the memory, and decoding the coded data stored in the memory to restore the original data when memory transmission is actually started, then adding the sender information at the head of the restored data and again encoding the integrated data and transmitting it.

(Method 3)

This method is implemented by scanning the image data, adding the sender information to the scanned data immediately after scanning on the transmission side, then compressing the total data into the memory and transmitting it.

(Method 4)

This method is implemented by scanning image data, encoding it beforehand and storing the coded data into the memory, and then also encoding the sender information when memory transmission is actually started, then merging the two sets of coded data and transmitting it.

However, the above methods 1, 2 and 3 have the problems as follows:

The problem with Method 1: this method needs a high capacity memory for temporarily storing uncompressed image data.

The problem with Method 2: this method takes long time for processing the coding and decoding.

The problem with Method 3: the time of transmission, included in the sender information attached at the time of image scanning represents a past time, so that it is impossible to transmit the information of the exact time of transmission.

On the contrary, merging the coded data of the scanned image and coded data of the sender information according to Method 4 can avoid the above three problems. However, the image data and the sender information are coded independently, so that it is not possible to encode the image to be transmitted second making the best use of the correlation with the image to be transmitted first. Therefore, there are some limitations in encoding based on Method 4.

In connection with the above, mentioned as coding methods for monochrome transmission can be MH(Modified Huffman), MR(Modified Read), MMR(Modified Modified Read) and JBIG(Joint Bi-level Image Group).

MH is a coding scheme performed by coding run-lengths of 'white' runs and 'black' runs for each line by Huffman codes and adding a line synchronizing signal EOL at the end of every one line of codes.

MR is an improved MH coding, in which data is coded by using the correlation with the previous line in order to enhance the compressibility. That is, the first line is coded based on MH, the data from the second to K-th line is coded making use of the correlation with previous lines. Then, the data on the (K+1)-th line is coded by MH, and this cycle is repeated. This number 'K' is called the 'K-parameter'. The MR coding also uses the line synchronizing signal EOL.

Since MH uses independent data for each line and MR uses an independent line of data for every K lines, part of the image can be encoded and decoded independently. Because these schemes are originally assumed to be used for the lines without error correction, if a transmission error occurs, the decoded image only presents partial irregularities not affecting the total image.

In contrast, because MMR is an encoding scheme having an infinite K (K=∞) and JBIG is a Markov model coding scheme, these schemes need reference pixels for encoding. Accordingly, it is impossible for MMR and JBIG to code and decode part of an image independently. Therefore, in these coding schemes, the error correction mode(ECM) is essential.

As understood from the above description, of encoding schemes of monochrome transmission only MH and MR can realize memory transmission with sender information attached based on Method 4.

In the field of color facsimile technologies, JPEG(Photographic Picture Experts Group) has been adopted as a standard coding scheme. While for color facsimile, the coding scheme is the same as that of monochrome facsimile in terms of recommendations, hence JPEG is also one of coding scheme options. In JPEG, the DC component and AC components are coded in the order mentioned. Since the DC component of a pixel block has a strong correlation with that of the previous pixel block, the difference is used to encode. For countermeasures against transmission failure due to image disturbance resulting from transmission error and for allowing random access, restart markers for initializing the DC component are provided and can be used.

Also in JPEG, if data coding is effected by inserting a restart marker immediately after the right end block of the image, the image can be separated vertically into two parts, so that it becomes possible to merge sets of coded data in the same manner as in the MH and MR schemes for monochrome.

As understood from the above, attachment of sender information upon memory transmission in color facsimile may be performed based on a JPEG scheme using restart markers. This has been disclosed in Japanese Patent Application Laid-Open Hei 11 No.313210.

Attachment of sender information at the leading side of the image using the restart marker, however, presents the problem of lowering of the encoding efficiency. In order to clarify the reason of this problem occurring, the JPEG algorithm and JPEG data format will be described first.

A color image is composed of three components, each having tones, so that the amount of data is bulky compared to that of a monochrome binary image of the same size. For example, a color image of 256 tones is composed of a data amount 24(=3×8) times as large as that of a monochrome binary image. Therefore, an efficient compression scheme is desired for transmission.

JPEG which is most prevalent as a compression method for natural color images is used in many applications such as for digital cameras, personal computers, the internet, etc.

In the field of color facsimile, JPEG is used as the standard coding scheme though the CIELAB color space is used while other applications use the YCbCr color space which permits linear transformation from the RGB space.

Further, as to facsimile transmission there are cases where the number of lines or line count of the input image is unknown beforehand because the original is input through a sheet feed type scanner. Therefore, it is approved that the information of the line count may be put at the end of the compressed data.

JPEG is short for the Group 'Joint Photographic Experts Group', for jointly producing standards for coding still images, working on both ISO and CCITT(now ITU-T) standards. At present, however, it mainly indicates the coding scheme and coded file format defined by this group.

There are a number of JPEG algorithms. The one that is adopted for color facsimile is the same as that used in many other applications and is called the JPEG baseline algorithm.

FIG. 1 is a schematic diagram showing the coding and decoding scheme based on the JPEG baseline algorithm. Referring to next to FIG. 1, the JPEG baseline algorithm of coding and decoding and the functions of the blocks will be briefly described.

On the coding side 600, the original image data(CIELAB) 601 obtained from an original image after color transformation is subjected to subsampling at a subsampling portion 602. Then, each 8×8 block for luminance and chrominance is transformed by the DCT at a DCT portion 603. Then, the DCT coefficients determined by the DCT portion 603 are quantized at a quantizer 604. Huffman codes are assigned to the quantized DC component and AC components at a Huffman encoder 605. Other than the compressed data, the JPEG data includes parameters required for decoding such as information etc., for creating a quantization table T1 and a Huffman table T2. Therefore, a control code adder 606 is provided to add the parameters of quantization table T1 and Huffman table T2 having been used during data compression in quantizer 604 and Huffman encoder 605, whereby JPEG data 607 to be transmitted is produced.

The data processing on the decoding side is basically performed by reverse operations of the coding. First, at a control code adder 606b, necessary parameters such as quantization table T1, Huffman table T2 and the like are extracted from JPEG data 607 so as to make a preparation for decoding of the compressed data. Then, the compressed data is subjected to the Huffman decoding, inverse quantization, inverse DCT and interpolation, on the basis of the parameters, through a Huffman decoder 605b, inverse quantizer 604b, inverse DCT portion 603b and interpolation portion 608 in the order mentioned, whereby a decoded image 601b is obtained.

It should be noted that in JPEG, since some information losses will take place through quantization, the decoded image does not completely agree with the original image. This kind of process is called irreversible coding.

Once the data based on JPEG is damaged, it is impossible to restore the data. Therefore, ECM is essential for facsimile transmission and reception.

The reason subsampling is performed at subsampling portion 602 is that the human eye is insensitive to spatial variations in chrominance compared to spatial variations in luminance. That is, only the resolution as to the chrominance is reduced by quality reduction while the resolution as to the luminance is left as is. Not only this process makes the data be compressed but also provides an advantage of reducing the amount of operations because of reduction in number of the blocks to be subjected to the DCT process as described below.

In color facsimile, subsampling with a ratio of 4:1:1 of the chrominance data a*, b* is basically performed by taking the average of four pixels to reduce their vertical and horizontal resolutions to half. Therefore, four blocks of luminance data L* correspond to one block of luminance data a* and one block of luminance data b*.

The DCT at DCT portion 603 is a kind of orthogonal transform. As shown in FIG. 2, output from one 8×8 block P(x,y) for one component of an original image is one 8×8 DCT coefficient block F(u,v). The value at the upper left in a DCT coefficient block F(u,v), i.e., F(0,0) indicates its DC component and other values in the block represent AC components.

The specific equation of the transformation in eight bit mode in the JPEG baseline algorithm is expressed as follows:

$$f(x, y) = P(x, y) - 128 \quad \text{(Formula 1)}$$

$$F(u, v) = \frac{1}{4}\{C(u)C(v)\} \sum_{x=0}^{7}\sum_{y=0}^{7}\left[f(x, y)\cos\left\{\frac{(2x+1)u\pi}{16}\right\}\cos\left\{\frac{(2x+1)v\pi}{16}\right\}\right]$$

$$(u, v, x, y = 0 \text{ to } 7)$$

$$c(0) = \frac{1}{\sqrt{2}}$$

$$c(n) = 1 \quad (n \neq 0)$$

The quantization at quantizer 604 is expressed as the following formula:

$$G(u,v)=[F(u,v)/Q(u,v)]$$

$$(u, v=0 \text{ to } 7)$$

where F(u,v) represents the DCT coefficients before quantization, Q(u,v) represents quantization table T1 and G(u,v) represents the coefficients after quantization, and [ ] denotes rounding.

A different quantization table Q(u,v) may be used for each of the color components L*, a* and b*, but generally, for most cases, one table is used for luminance and another one for chrominance. Usually, for high frequency components, the values in the table are made large so as to roughen the quantization. This can be justified because the human visual sensitivity becomes lower for the higher frequency components. That is, if the information of the higher frequency components is roughly quantized, image degradation is hardly perceived. Nevertheless, since the image appearance depends on the image size, the viewpoint distance, the resolution and other factors, the optimal tables differ from one another depending upon the application used.

Upon code assignment of the DCT coefficients after quantization at Huffman encoder 605, since the DC component has a strong correlation with that of the previous block, a Huffman code is assigned to its difference from that of the previous block, as shown in FIG. 3.

For the AC components, the values are detected by diagonally traversing scan in the zigzag order as shown in FIG. 4, coding is performed in the following steps shown in the flowchart in FIG. 5.

(1) Scan the AC components in the zigzag order as shown in FIG. 4 (Step S1)
(2) If the observed component is not equal to zero, perform grouping (Steps S2 and S3)
(3) If the observed component is equal to zero, count the run-length (Steps S2 and S4)
(4) If all the components scanned in the zigzag order are zero until the end, stop the operation.

Since the higher frequency AC components after quantization are usually divided by greater values, most of the values will converge to zero. Therefore, the amount of codes can be markedly reduced by the procedures (3) and (4).

Since the optimal Huffman coding differs depending upon the image and quantization table T1 used, the Huffman table T2 is allowed to be selected in JPEG (Step S5).

Now that the JPEG algorithm has been described, in order to positively decode the coded data under different circumstances, it is necessary to send various parameters in the common format in addition to the compressed data thus produced based on the coding algorithm. This is why the exchange format of coded data is specified in the JPEG standard. Next, the data structure of the exchange format of JPEG data will be described with reference to FIG. 6.

It is assumed for convenience sake that JPEG data is roughly divided into three parts, namely leading marker code portion TM, image information portion II and the end marker code portion EM.

Leading marker code portion TM necessarily starts with a SOI area, followed by an area for marker group M including various parameters for decoding.

The marker group M includes marker segments APP1, COM, DHT, DQT, SOF0, DRI and SOS.

The marker segment APP1 is introduced for color facsimile and contains a facsimile identifier and resolution information.

The marker segment COM holds comments such as a product name etc., having no effect on compression.

The marker segment DHT includes the information for generating Huffman table T2 and the marker segment DQT includes quantization table T1.

The marker segment SOF0 is the frame header for JPEG baseline and includes the line count in the image and the image width.

The marker segment SOS should be located immediately before compression data while the marker segments SOF0, DHT and DQT may be positioned at any place between the area SOI and marker segment SOS. As to marker segments DHT and DQT, all tables may be included in a single marker segment, or a multiple number of marker segments may be used each including one table only. The information as to assignment of the tables to different color components is included in the marker segment SOS.

The marker segment DRI stores the value of a restart interval which designates the interval between after mentioned restart markers RM. These will be described later.

The end marker code portion EM(FIG. 6) is comprised of marker segments DNL and EOI.

The marker segment DNL holds an NL parameter which designates the line count.

The DNL is provided assuming a case where the encoding side has no memory for storing the entire image and cannot determine the line count at the time of coding. That is, this marker segment is used to designate the line count in the image after compression. In this case, the line count stored in the marker segment SOF0 is a dummy line count, and the NL parameter of marker segment DNL indicates the true line count. Here, the relation: the line count Y>NL or Y=0 should hold.

For color facsimile data, JPEG data with the line count designated by marker segment DNL must be decoded. Use of the marker segment DNL is defined in the JPEG standard but is not found in other applications but being unique to facsimile data.

The image information portion II is comprised of compressed data portions CD and restart markers RM as shown in FIG. 6. In the JPEG algorithm, one unit of one color component is encoded then another unit of a next color component is encoded. The cyclic unit is called a MCU. For the case of the 4:1:1 subsampling, four blocks of the luminance component and one block for each of the two components of chrominance form one MCU.

It is ruled in the JPEG standard that if restart markers RM are used, they must be interposed at every boundary between MCUs. This interval is called the restart interval and is designated by the marker segment DRI(FIG. 7) in the leading marker code portion TM.

For color facsimile communication, while the JPEG algorithm described heretofore is adopted as the standard coding scheme, use of restart markers RM upon attachment of sender information after encoding in memory transmission has the following problems.

Since the DC component value corresponds to the total value of the pixels in the block, it varies depending on the location in the image but the differential values between DC components inherently converge to around zero. Therefore, it is possible to improve the encoding efficiency by allotting short codes to small differential values.

However, code assignment immediately after restart markers RM is made not to the differential values between DC components but to the DC components themselves. Therefore, the more the restart markers RM are, the more the encoding efficiency decreases.

Text for the sender information can be represented with about 32 lines at 200 dpi. Since one block has 8×8 pixels, 1 MCU is made up of 16×16 pixels in a 4:1:1 subsampling configuration. The sender information attached to an A4 sized image having a width of 1728 pixels is constituted by 216(1728/16*32/16) MCUs. Therefore, to add the sender information after coding, the interval at which restart markers RM are inserted should be set at 216 MCUs.

However, the interval between restart markers RM cannot be varied according to the JPEG standard. Therefore, if the sender information is added at the leading side of the image, a number of restart markers RM must be inserted within the image data at intervals of the same distance, even though all of them but one, which should be inserted at the connection where the sender information and the image are merged, are not actually needed.

As a result, compressed data CD is forced to be divided by restart markers into rectangular blocks of 32 lines the way the sender information 4 is defined. FIG. 8 shows the relationship between the JPEG data and the image. FIG. 8(a) is an example image of an original image 1 added with a sender information 4 arranged at its leading end. FIG. 8(b) is a schematic diagram showing the relationship of JPEG data with blocks of image divided by the lines in the image in (a). A reference numeral C1 designates a piece of compressed data corresponding to one block in original image 1 and C4 designates the compressed data of sender information 4.

Since restart marker RM initializes the DC component, correlation between DC components can be used less as the restart markers increase in number, posing the problem of the encoding efficiency being lowered. Since an A4 sized image is about 2300 lines in height, about 71 (=2300/32) restart markers are inserted in a page of image, resulting a marked degradation of encoding efficiency.

SUMMARY OF THE INVENTION

The present invention has been achieved to eliminate the above problem, it is therefore an object of the present invention to provide an image encoding apparatus in which the encoding efficiency is improved by avoiding an increase in number of restart markers when sender information is added at the leading side of an image.

In order to achieve the above object, the present invention is configured as follows:

In accordance with the first aspect of the present invention, an image encoding apparatus which sends a single transmission image by first coding a first image and a second image having a smaller area than the first image and combining them, with the second image arranged in the upper side of the first image in the single transmission image, includes:

an image rotating portion for rotating each of the first and second images by approximately 180 degrees and outputting the first and second rotated images;

an encoder portion for generating the first set of codes corresponding to the first rotated image and the second set of codes corresponding to the second rotated image, based on the coding block unit determined depending on the size of the first rotated image; and a code merging portion for combining the second set of codes after the first set of codes.

According to the above first aspect of the present invention, since the image rotating portion rotates the transmission image by approximately 180 degrees, i.e., by the angle which will not produce any image loss of the output of the transmission image, the encoding can be implemented in the reverse direction so that the first image is encoded first previous to the second image. This configuration allows the encoder portion to implement encoding of the first and second rotated images, based on the coding block unit determined depending on the size of the first rotated image. Here, since the second rotated image is smaller than the first rotated image, the second rotated image will not be divided into multiple coding blocks. That is, the combined image of the first and second rotated images can be encoded by processing two blocks only, so that it is possible to reduce the implementations of resetting data compression etc., for every coding block to a minimum frequency and hence improve the encoding efficiency.

In accordance with the second aspect of the present invention, the image encoding apparatus having the above first feature is characterized in that the encoder portion determines the interval at which identification codes indicating coding block units are inserted, based on the size of the first rotated image.

According to the above second aspect of the present invention, since the interval at which identification codes indicating the boundaries between coding block units are inserted is determined based on the size of the first rotated image, no identification code will be inserted into the codes of the second rotated image which is smaller than the first image. Therefore, it is possible to improve the encoding efficiency.

In accordance with the third aspect of the present invention, the image encoding apparatus having the above first feature is characterized in that the code merging portion combines the first set of codes and the second set of codes with reference to the identification code indicating the boundary between coding block units.

In accordance with the fourth aspect of the present invention, the image encoding apparatus having the above first feature is characterized in that the encoder portion generates codes for a dummy image after the identification code indicating the boundary between coding block units when the first rotated image is encoded, and the codes for a dummy image can be replaced with the codes of the second rotated image.

In accordance with the fifth aspect of the present invention, the image encoding apparatus having the above first feature is characterized in that upon encoding, the encoder portion generates a line count definition parameter at the position before, and a line count redefinition parameter at the position after, the subject codes as the encoding target, assigns a dummy value as the line count definition parameter for the first set of codes, and assigns the line count of the merged image information of the first and second rotated image information as the line count redefinition parameter for the second set of codes.

In accordance with the sixth aspect of the present invention, the image encoding apparatus having the above first feature is characterized in that upon encoding, the encoder portion generates a line count definition parameter at the position before, and a line count redefinition parameter at the position after, the subject codes as the encoding target, assigns the line count of the merged image information of the first and second rotated image information as the line count definition parameter for the first set of codes, and assigns the line count of the first rotated image information as the line count redefinition parameter for the first set of codes.

According to the above third to sixth aspects of the present invention, it is possible to positively combine the first and second sets of codes.

In accordance with the seventh aspect of the present invention, the image encoding apparatus having the above first feature is characterized in that the second image is an image of sender information represented in a bitmap form.

According to the above seventh aspect of the present invention, since the second image, i.e., sender information widely used for facsimile etc., made up of text, numerals, symbols and codes etc., can be laid out with a normal orientation in the upper part of the first image, this configuration provides for the receiver transmission images with easy-to-recognize sender information attached thereto.

BRIEF DESCRIPTION OF THE DRAWINGS

FIG. 12 is a diagram for explaining the manner of coding and code merging in accordance with example 3 of the present invention; and FIG. 13 is an illustrative view showing an inverted image with its transmission data in accordance with the embodiment of the present invention.

DESCRIPTION OF THE PREFERRED EMBODIMENTS

Figure 1:
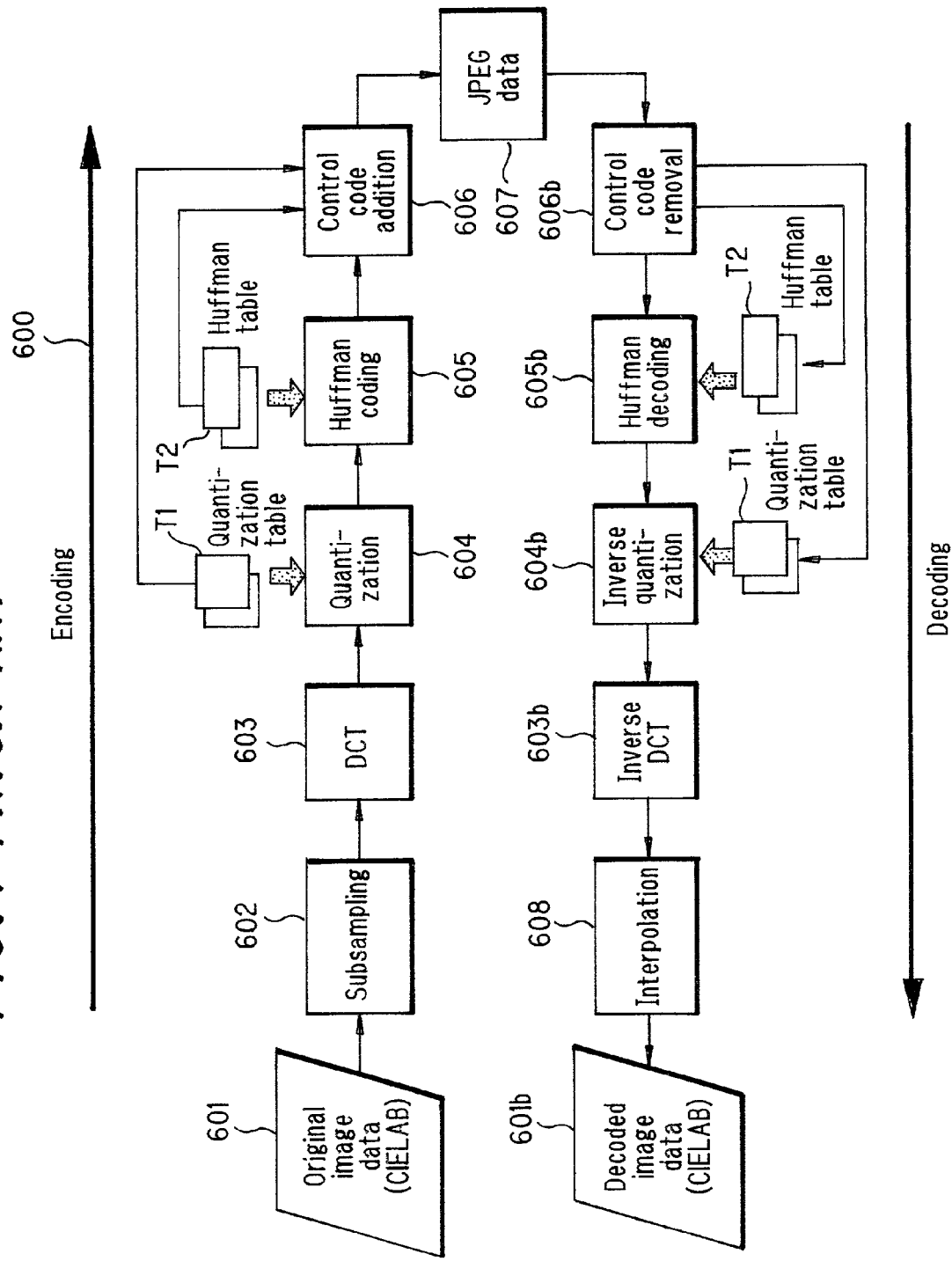
FIG. 1 is an overall block diagram for illustrating JPEG coding and decoding.
Figure 2:
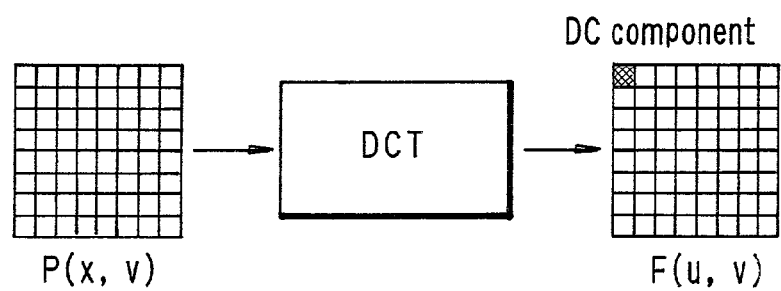
FIG. 2 is an illustrative view showing the DCT.
Figure 3:
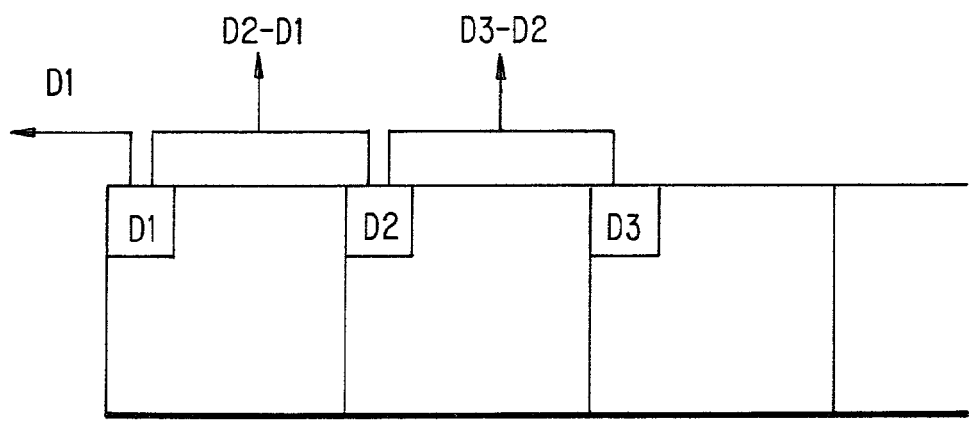
FIG. 3 is an illustrative view showing a method of coding DC components.
Figure 4:
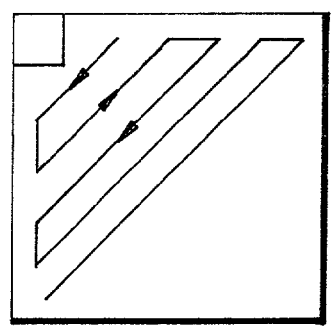
FIG. 4 is an illustrative view showing zigzag scanning.
Figure 5:
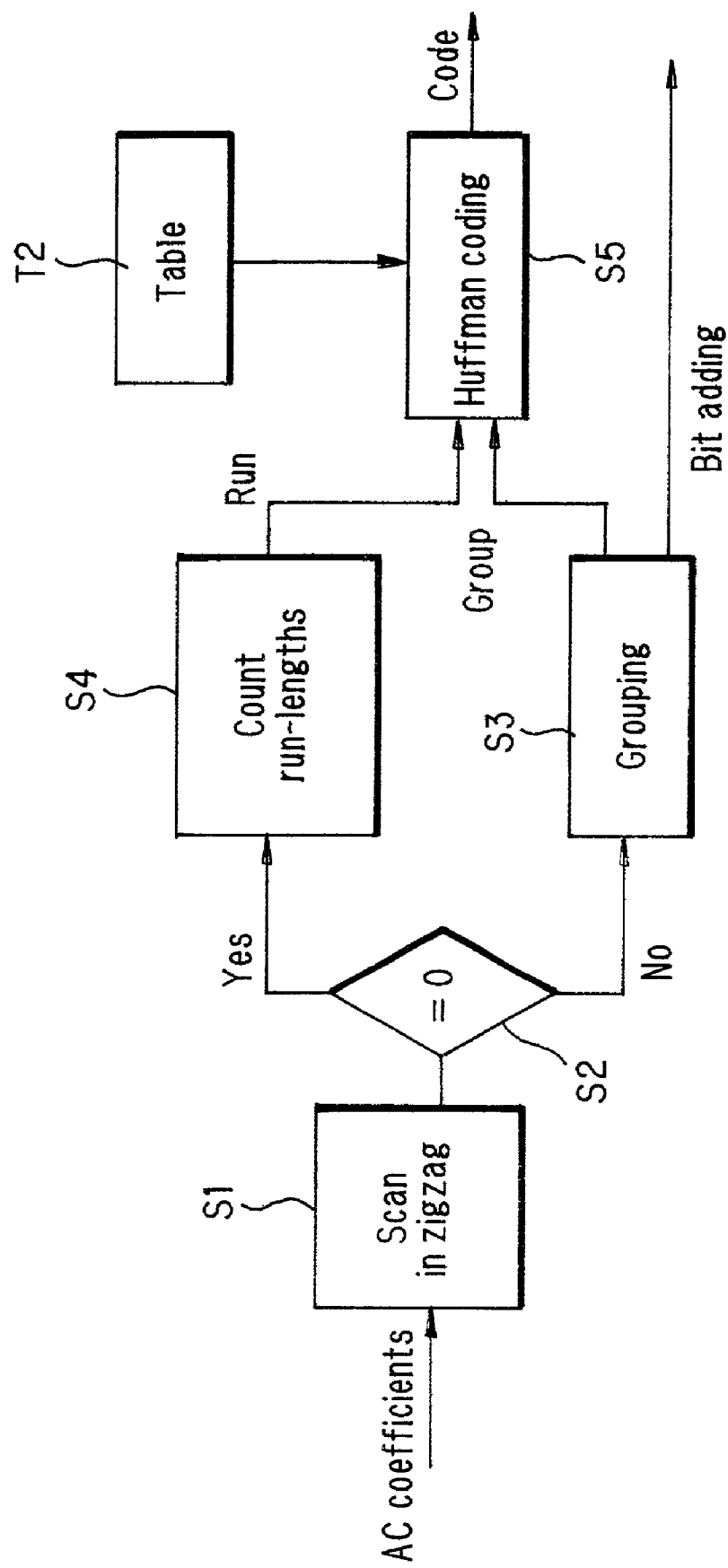
FIG. 5 is a block diagram for illustrating a method of coding AC components.

The embodiment of the present invention will hereinafter be described in detail with reference to the accompanying drawings. The same parts as those described above are allotted with the same reference numerals and the description is omitted.

Figure 9:
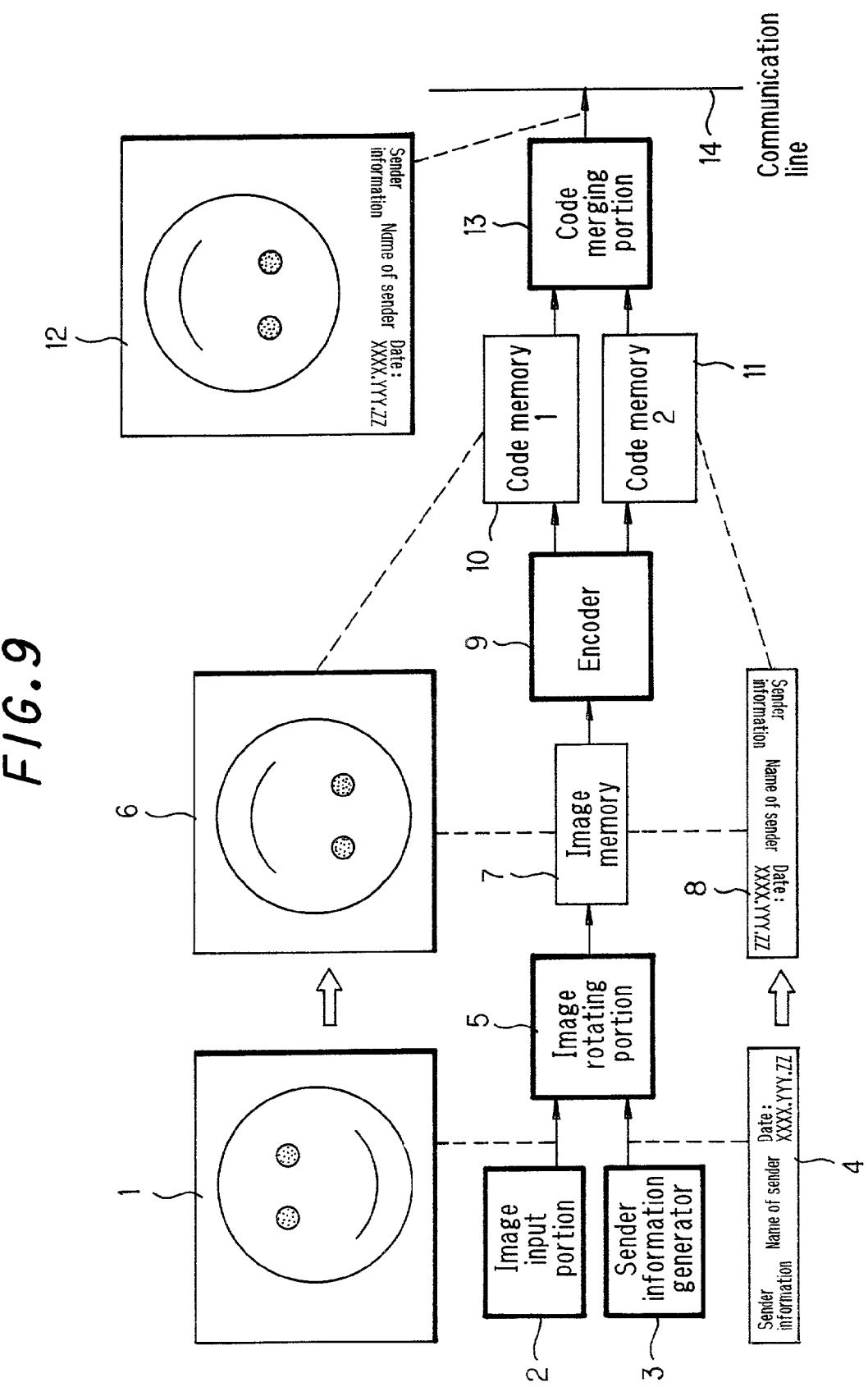
FIG. 9 is a block diagram showing an overall configuration of an image encoding apparatus in accordance with the embodiment of the present invention.

FIG. 9 is a block diagram showing an overall configuration of an encoder portion in an image encoding apparatus in accordance with the embodiment of the present invention.

The image encoding apparatus in accordance with the embodiment of the present invention includes: an image input portion 2 for inputting an original image 1 to be transmitted; a sender information generator 3 for generating a sender information image 4 bitmapped based on the sender information; a image rotating portion 5 for rotating the input image by 180 degrees and outputting the rotated image; an image memory 7 for temporarily storing the image output from image rotating portion 5; an encoder portion 9 for encoding the rotated image; a pair of code memories 10 and 11 for storing the coded data from encoder portion 9; and a code merging portion 13 for merging a pair of sets of coded data.

Reference numerals 1 and 6 in FIG. 9 designate schematic drawings showing an image 1 to be transmitted and its rotated image 6. Reference numerals 4 and 8 designate schematic drawings showing a sender information image 4 bitmapped from sender information and its rotated sender information image 8. A reference numeral 12 designates a schematic drawing showing a transmission image 12 which is created by merging the pieces of coded data. When the transmitted data is decoded and printed, this drawing is reproduced. The broken lines in FIG. 9 indicate correspondence between the drawings and image data or code data.

Image input portion 2 generates image data to be transmitted, by creating digital image data by scanning a document with a printed image thereon using an unillustrated scanner, or by processing existing digital image data.

Sender information generator 3 creates a bitmap representation of the sender information such as the sender name, time of transmission etc., represented in a certain font to generate image data 4.

Image rotating portion 5 rotates the input image data by 180 degrees. That is, this rotates the image data output from image input portion 2 and the image data 4 output from sender information generator 3 by 180 degrees or reverses the direction of coding and outputs it to image memory 7.

In the description of the embodiment, the angle of rotation is set at 180 degrees, but the angle of rotation may be set at any value which approximately inverts the orientation of the input image data. That is, any angle of rotation may be permitted as long as the output of the entire transmission image has not been lost when the image data after rotation is decoded. The angle of rotation which will not cause any loss of the image data will be referred to as 'approximately 180 degrees'. Therefore, approximately 180 degrees may differ depending on the size, layout and other factors of the transmission image with respect to the output paper.

Image memory 7 stores the rotated image, obtained by rotating input image 1 by 180 degrees, and encoder portion 9 encodes this 180 degree rotated image.

Code memories 10 and 11 store the rotated and encoded image data and the rotated and encoded image data of the sender information, respectively.

Image merging portion 13 merges two pieces of coded data and outputs the result to communication line 14.

There are several methods of coding through encoder portion 9 and merging the coded data through image merging portion 13, of which common features are described as follows:

(a) Concerning the Image Size

The number of lines or line count for an input image, represented by Y1 and the line count for a sender information, represented by H, should be specified to be at multiples of 16 when 4:4:1 subsampling is implemented and at multiples of 8 when 1:1:1 subsampling is implemented.

(b) Concerning the Restart Interval

The value of the restart interval stored in the marker segment DRI (FIG. 7) is determined depending on the image width X and the line count Y1. That is, when 4:1:1 subsampling is implemented, the interval is set to be (X/16)×(Y1/16). When 1:1:1 subsampling is implemented, the interval is set to be (X/8)×(Y1/8).

Next, the methods of coding and merging the coded data will be described with reference to examples 1 to 3.

EXAMPLE 1

Figure 10:
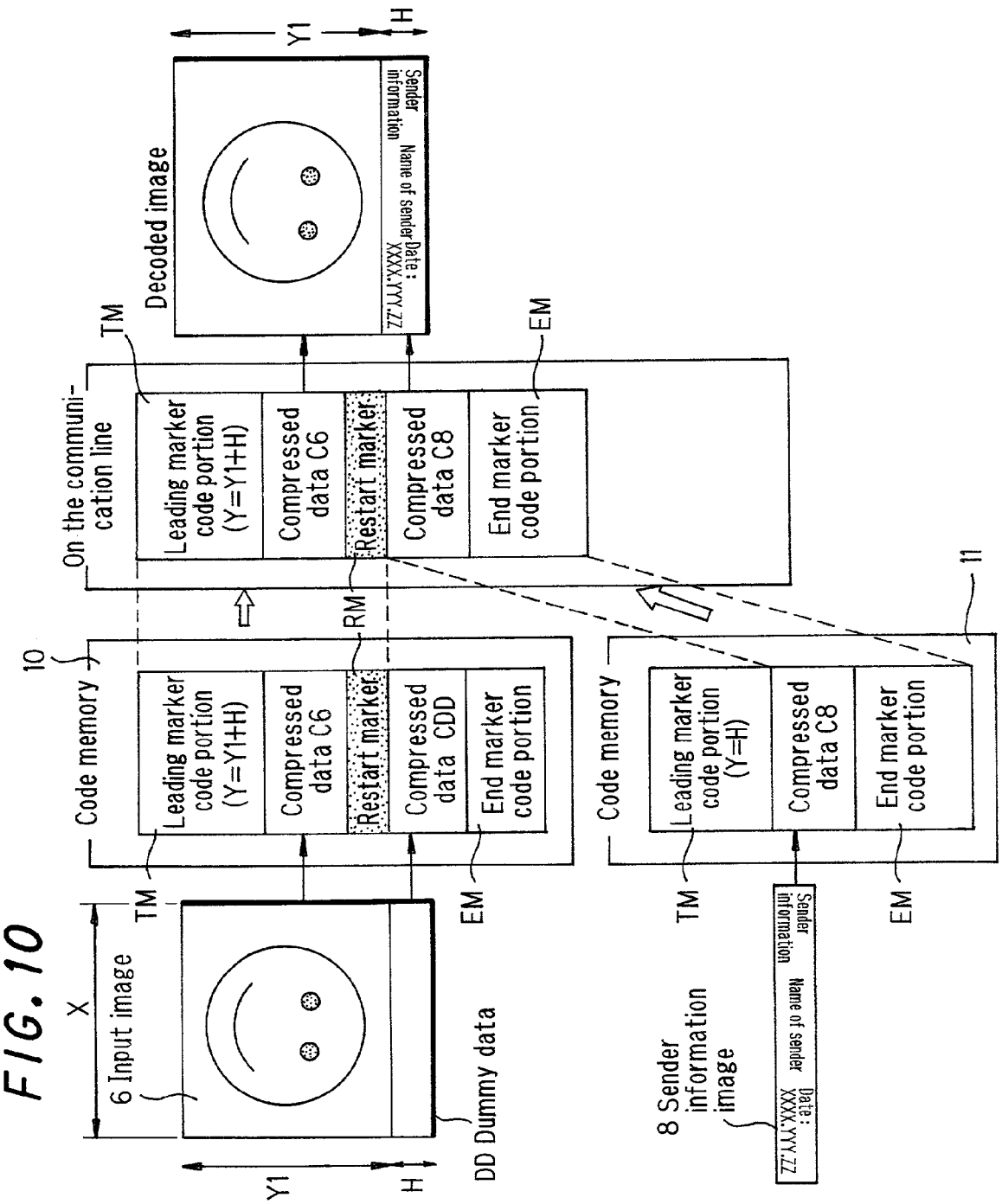
FIG. 10 is a diagram for explaining the manner of coding and code merging in accordance with example 1 of the present invention.

The first method in example 1 of coding and merging the coded data is implemented by stuffing the image data with dummy data, encoding the entire data, then replacing the dummy data with the coded data of the sender information. This will be described in detail with reference to FIG. 10.

Concerning the encoding of input image 1, the Y parameter (the line count) of the marker segment SOF0(see FIG. 7) in the leading marker code portion TM is set to be the actual line count Y1+H while dummy data DD having H lines equal to those of sender information image 4 is attached under the rotated input image 6. The thus generated image is totally encoded based on JPEG.

Figure 7:
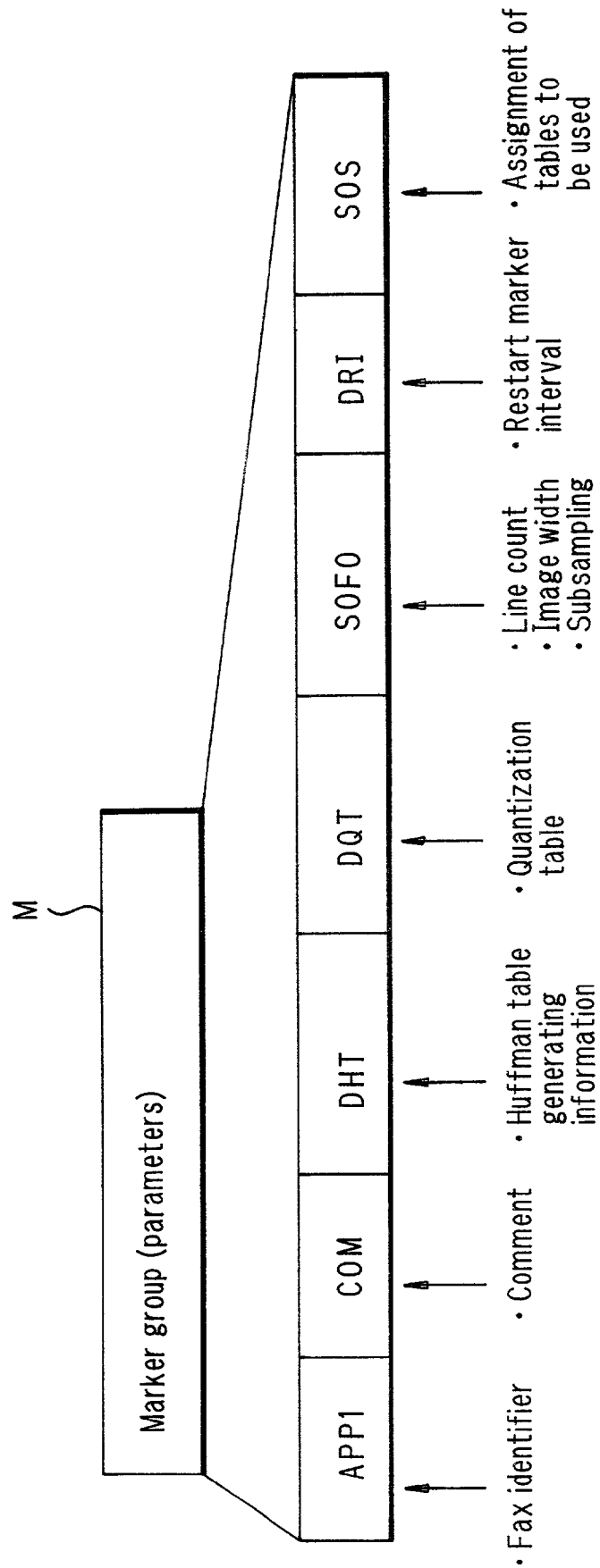
FIG. 7 is an illustrative view showing specific marker segments contained in a marker group.
Figure 8:
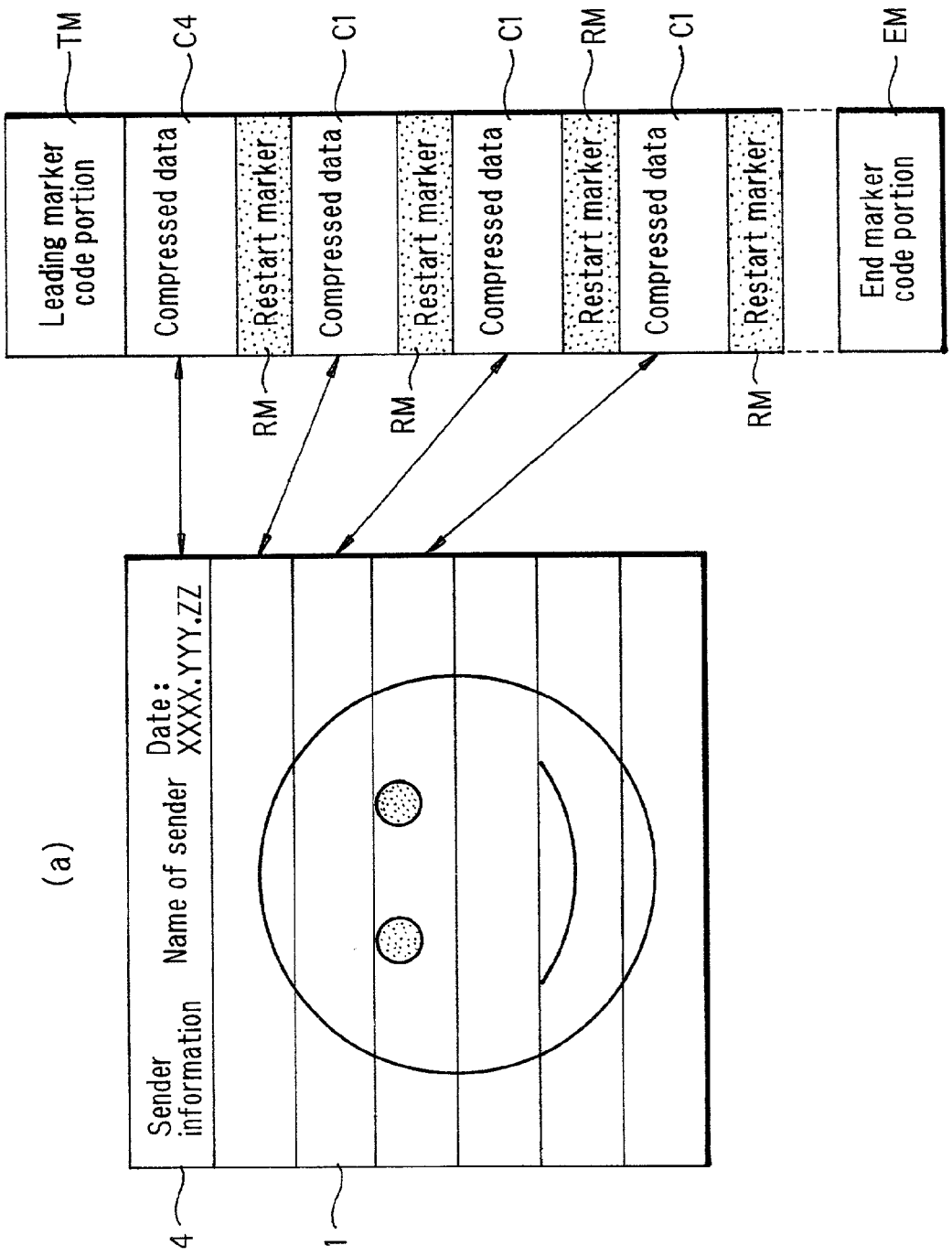
FIG. 8 is an illustrative view showing the relationship between an image to be transmitted and its transmission data in a conventional image encoding apparatus.

Restart marker RM is inserted between the compressed data C6 for the rotated input image 6 and the compressed data CDD for the dummy data DD, following the restart interval value described in the marker segment DRI(see FIG. 7). The coded data is stored into code memory 10.

The rotated sender information image 8 is encoded separately from the rotated input image 6, based on JPEG and is stored into code memory 11.

Upon transmission, the leading marker code portion TM of the coded data, the compressed data C6 corresponding to rotated input image 6 and the restart marker RM, all stored in code memory 10 are transmitted, thereafter the compressed data C8 for rotated sender information image 8 and the end marker code portion EM are transmitted.

Resultantly, the transmitted codes become correspondent to a single transmission image 12 attached with rotated sender information image 8 and provide the same image when decoded.

EXAMPLE 2

Figure 6:
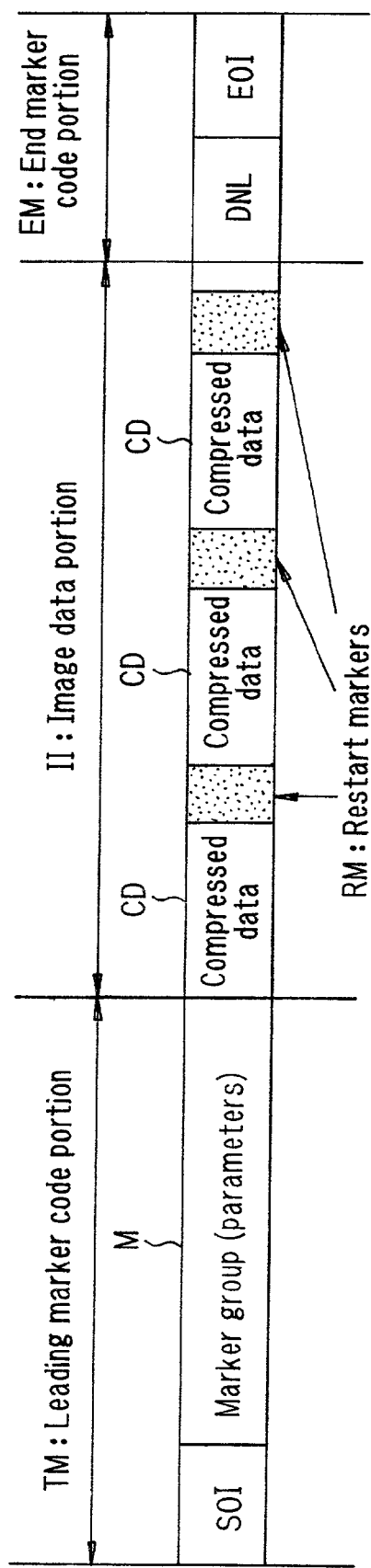
FIG. 6 is an illustrative view showing an exchange format of JPEG data.
Figure 11:
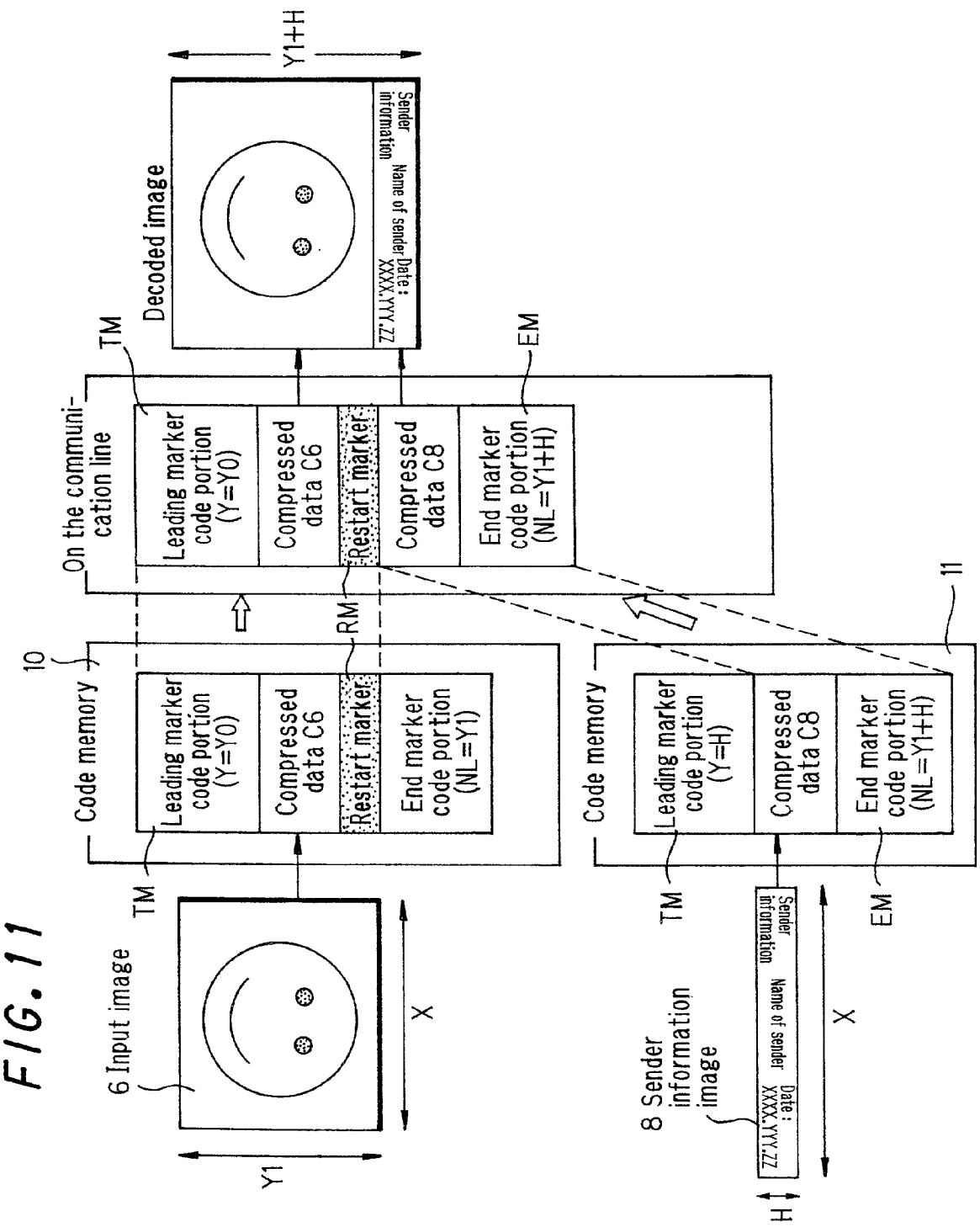
FIG. 11 is a diagram for explaining the manner of coding and code merging in accordance with example 2 of the present invention.

The second method in example 2 of coding and merging the coded data is implemented by putting a dummy value of the line count (Y0) as the Y parameter and setting the true line count into the marker segment DNL(see FIG. 6) of the end marker code portion EM when the image data is merged with rotated sender information image 8. This will be described in detail with reference to FIG. 11.

Concerning the encoding of input image 1, the Y parameter of the marker segment SOF0(see FIG. 7) in the leading marker code portion TM is set with a dummy image line count Y0 for the image. Here, Y0 should be Y0=0 or Y0>Y1+H.

In this case, only the rotated input image 6 with no dummy data DD(FIG. 10) shown in example 1 above, is encoded based on JPEG. Based on the restart interval set in the marker segment DRI(see FIG. 7), restart marker RM is placed after the compressed data C6, and the end marker code portion EM is placed after the marker. A marker segment DNL is put in the end marker code portion EM and the parameter NL is set at Y1(the true line count).

The rotated sender information image 8 is encoded separately from the rotated input image 6, based on JPEG and is stored into code memory 11. Here, the parameter Y in the marker segment SOF0 of the leading marker code portion TM is set equal to H (Y=H) and the parameter NL of the marker segment DNL of end code portion EM is set equal to Y1+H (NL=Y1+H).

Upon transmission, the leading marker code portion TM of the coded data, the compressed data C6 corresponding to rotated input image 6 and the restart marker RM, all stored in code memory 10 are transmitted, thereafter the compressed data C8 for rotated sender information image 8 and the end marker code portion EM are transmitted.

EXAMPLE 3

The third example of a method of coding and merging the coded data is implemented by setting the true line count of the image to be transmitted as the Y parameter and providing a DNL which designates the true line count in the image when no sender information image is attached. This will be described in detail with reference to FIG. 12.

Concerning the encoding of input image 1, the Y parameter of the marker segment SOF0(see FIG. 7) in the leading marker segment code portion TM is set with the actual line count (Y1+H) in the image. In this case, instead of using dummy data, a marker segment DNL is assigned in the end marker code portion EM, and NL is set equal to Y1(NL=Y1) so that only the rotated input image 6 is encoded based on JPEG.

Based on the restart interval designated in the marker segment DRI, restart marker RM is placed after the compressed data C6 of rotated input image 6, and the end marker code portion EM is placed after the marker. A marker segment DNL is put in the end marker code portion EM and the parameter NL is set at Y1(NL=Y1).

The 180 degree rotated sender information, image 8, is encoded separately from the rotated input image 6, and is stored into code memory 11.

Upon transmission, the leading marker code portion TM of the coded data, the compressed data C6 corresponding to rotated input image 6 and the restart marker RM, all stored in code memory 10 are transmitted, thereafter the compressed data C8 for rotated sender information image 8 and the end marker code portion EM are transmitted.

In the above three methods, the methods and means of examples 1 and 3 cannot be used unless the line count in the image to be transmitted is known before encoding the rotated sender information image 8. On the other hand, the method and means of example 2 can be used even if the line count H of rotated sender information image 8 becomes definite at last just before transmission. With any of the above methods, the codes stored in code memory 10, though they lack the code data C8 of rotated sender information image 8, can be decoded into a normal image.

Therefore, if the codes stored in code memory 10 are transmitted, the codes without data of sender information data image 8 can also be transmitted.

In connection with the above, it should be noted that for the case of example 2 there is a risk that the codes of rotated sender information image 8 stored in code memory 11 might be unable to be decoded correctly because Y<NL.

With any of the above first to third methods, the codes transmitted as illustrated in FIGS. 9 and 13 represent a single transmission image 12 including rotated sender information image 8 therein and can produce the image when decoded. In any of the above methods, only one restart marker RM is used.

As has been described heretofore, when an input image 1 and sender information image 4, independent from each other, are combined to create a single transmission image and if the sender information image 4 of a lower line count (small area) and the input image 1 having a larger area than the sender information image 4 are arranged above and below each other in the transmission image, the input image 1 and sender information image 4 may be individually rotated by 180 degrees before encoding so that the JPEG encoding can be started from the larger area or from the input image 1 side. With this scheme, the coding block unit can be determined based on the input image 1, whereby it is possible to combine two sets of codes by only inserting a single restart marker RM between the codes of rotated input image 6 and those of rotated sender information image 8.

On the contrary, if input image 1 and sender information image 4 are encoded without being rotated 180 degrees before encoding, the coding block unit is determined based on the area of sender information image 4 having a lower line count, so that many restart markers RM should be included in the codes of input image 1 having a larger area.

Accordingly, in accordance with the image encoding apparatus of the embodiment described above, no restart marker will be included during encoding of input image 1, thus enhancing the encoding efficiency.

As has been described heretofore, according to the aspect of the present invention, when a secondary image such as sender information, for example, needs to be attached to the subject image when memory transmission is implemented, the first image having a large area can be encoded as a single coding block. Therefore, it is possible to combine the two images by inserting only one restart marker, which functions as an identification code attached to JPEG codes to be transmitted, between the first set of codes and the second sets of codes. As a result, a marked improvement of the encoding efficiency can be achieved compared to the conventional technique wherein many restart markers are needed.

Also, for color facsimile, color ink-jet printers are often used with plain paper. Therefore, the image is printed on a cut sheet, so that it is not unnatural if inverted images are transmitted because the user may simply turn the paper upside down. Further, since the paper generally comes out from the front of the printer toward the user, the paper with printed images thereon can be discharged with a normal orientation, which is an advantage for the user.

What is claimed is:

1. An image encoding apparatus which sends a single transmission image by first coding a first image and a second image having a smaller area than the first image and combining them, with the second image arranged in the upper side of the first image in the single transmission image, comprising:
   an image rotating portion for rotating each of the first and second images by approximately 180 degrees and outputting the first and second rotated images;
   an encoder portion for generating a first set of codes corresponding to the first rotated image and a second set of codes corresponding to the second rotated image, in a coding block unit determined by inserting an identification code at a position corresponding to the size of the first rotated image; and
   a code merging portion for combining the second set of codes after the first set of codes.

2. The image encoding apparatus according to claim 1, wherein the encoder portion determines an interval at which identification codes indicating coding block units are inserted, based on the size of the first rotated image.

3. The image encoding apparatus according to claim 1, wherein the code merging portion combines the first set of codes and the second set of codes with reference to the identification code indicating the boundary between coding block units.

4. The image encoding apparatus according to claim 1, wherein the encoder portion generates codes for a dummy image after the identification code indicating the boundary between coding block units when the first rotated image is encoded, and the codes for a dummy image can a replaced with the codes of the second rotated image.

5. The image encoding apparatus according to claim 1, wherein upon encoding, the encoder portion generates a line count definition parameter at the position before, and a line count redefinition parameter at the position after, the subject codes as the encoding target, assigns a dummy value as the line count definition parameter for the first set of codes, and assigns the line count of the merged image information of the first and second rotated image information as the line count redefinition parameter for the second set of codes.

6. The image encoding apparatus according to claim 1, wherein upon encoding, the encode portion generates a line count definition parameter at the position before, and a line count redefinition parameter at the position after, the subject codes as the encoding target, assigns the line count of the merged image information of the first and second rotated image information as the line count definition parameter for the first set of codes, and assigns the line count of the first rotated image information as the line count redefinition parameter for the first set of codes.

7. The image encoding apparatus according to claim 1, wherein the second image is an image of sender information represented in a bitmap form.

* * * * *